(12) United States Patent
Yamamoto (10) Patent No.: US 7,505,903 B2
(45) Date of Patent: Mar. 17, 2009

(54) SPEECH RECOGNITION DICTIONARY CREATION METHOD AND SPEECH RECOGNITION DICTIONARY CREATING DEVICE

(75) Inventor: Hiroki Yamamoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 786 days.

(21) Appl. No.: 10/760,314

(22) Filed: Jan. 21, 2004

(65) Prior Publication Data

US 2004/0153312 A1 Aug. 5, 2004

(30) Foreign Application Priority Data

Jan. 29, 2003 (JP) ............... 2003-021029

(51) Int. Cl.
G10L 15/00 (2006.01)
G10L 15/28 (2006.01)
(52) U.S. Cl. ............... 704/235; 704/231; 704/255
(58) Field of Classification Search ............... None
See application file for complete search history.

(56) References Cited

U.S. PATENT DOCUMENTS

| 5,956,679 | A | 9/1999 | Komori et al. ............... 704/256 |
| 5,970,445 | A | 10/1999 | Yamamoto et al. .......... 704/230 |
| 6,308,151 | B1 * | 10/2001 | Smith ........................ 704/235 |
| 6,507,643 | B1 * | 1/2003 | Groner ................... 379/88.14 |
| 6,587,820 | B2 | 7/2003 | Kosaka et al. ............... 704/257 |
| 6,766,295 | B1 * | 7/2004 | Murveit et al. ............... 704/243 |
| 6,952,675 | B1 * | 10/2005 | Tahara et al. ................. 704/255 |
| 7,146,320 | B2 * | 12/2006 | Ju et al. ....................... 704/257 |
| 2001/0032075 | A1 | 10/2001 | Yamamoto .................. 704/256 |
| 2002/0128826 | A1 | 9/2002 | Kosaka et al. ............... 704/211 |
| 2003/0097264 | A1 | 5/2003 | Kosaka et al. ............... 704/256 |
| 2003/0220793 | A1 | 11/2003 | Kosaka et al. ............... 704/270 |
| 2003/0236673 | A1 | 12/2003 | Nakagawa et al. .......... 704/277 |
| 2004/0002867 | A1 | 1/2004 | Nakagawa et al. .......... 704/275 |

FOREIGN PATENT DOCUMENTS

JP 2001-92485 4/2001

* cited by examiner

*Primary Examiner*—David R Hudspeth
*Assistant Examiner*—Samuel G Neway
(74) *Attorney, Agent, or Firm*—Fitzpatrick, Cella, Harper & Scinto (57) ABSTRACT

A speech recognition dictionary creation method is provided for creating a speech recognition dictionary that is used for creating document data such as electronic mails through voice input in an application capable of communicating document data. The method includes the steps of: detecting that a document data creation processing is started; reading document data obtained by the application when the document data creation processing is started; analyzing the document data read and extracting unknown words that do not exist in an existing speech recognition dictionary; and creating a speech recognition dictionary containing the unknown words. The speech recognition dictionary creation method disclosed herein improves the users' convenience in using speech recognition dictionaries that are used in creating document data through voice input.

9 Claims, 8 Drawing Sheets

HEADER 41

To: speech-maillist
From: nak@atr.co.jp
Date: Fri, 28 Dec 2001 17:02:30 +0900
Subject: Notice for Next Meeting

MAIN BODY 42

| NOTATION 51 | PRONUNCIATION 52 |
|---|---|
| 久保 | KUBO |
| 様 | SAMA |
| 来月 | RAIGETU |
| の | NO |
| 音声 | ONSEI |
| 入出力 | NYUSHUTURYOKU |
| プロジェクト | PUROJECTO |
| の | NO |
| 例会 | REIKAI |
| は | WA |
| : | : |
| : | : |
| エスペランス | ESUPERANSU |
| 横浜 | YOKOHAMA |
| にて | NITE |
| : | : |
| : | : |
| 仲原 | NAKAHARA |
| 亘 | WATARU |

FIG. 5

| NOTATION 51 | PRONUNCIATION 52 |
|---|---|
| 入出力 | NYUSHUTURYOKU |
| 例会 | REIKAI |
| エスペランス | ESUPERANSU |
| 仲原 | NAKAHARA |

DATE AND TIEME OF UPDATE:
YY / MM / DD

— 71 DATE AND TIME OF UPDATE OF DICTIONARY

| 入出力 | NYUSHUTURYOKU |
| 例会 | REIKAI |
| エスペランス | ESPERANSU |
| 仲原 | NAKAHARA |

FIG. 8

81 DATE AND TIME OF UPDATE OF WORD

| 入出力 | NYUSHUTURYOKU | YY / MM / DD |
| 例会 | REIKAI | YY / MM / DD |
| エスペランス | ESPERANSU | YY / MM / DD |
| 仲原 | NAKAHARA | YY / MM / DD |

FIG. 9

SPEECH RECOGNITION DICTIONARY CREATION METHOD AND SPEECH RECOGNITION DICTIONARY CREATING DEVICE

BACKGROUND OF THE INVENTION

1. Field of the Invention

The present invention relates to a technology for creating speech recognition dictionaries.

2. Related Background Art

Along with the improvement made over speech recognition performance, applications equipped with a speech recognition function that allows creation of electronic mails by voice input have been commercialized. The mainstream of the present speech recognition is a method in which only words registered in a speech recognition dictionary are subject to speech recognition. According to this method, words that do not exist in the speech recognition dictionary (unknown words), in principle, cannot be recognized. Many of the speech recognition software for dictation are equipped with a speech recognition dictionary containing several ten thousands to several hundred thousands base words, which do not necessarily include all the words that are needed by individual users.

As one of the solutions to the above, many of the commercially available speech recognition applications are equipped with a function to allow the user to additionally register words to an existing speech recognition dictionary to update the speech recognition dictionary, or a function to allow the user to create a speech recognition dictionary for the user's personal use. The following methods have been realized for registering words: (1) a method in which information for words to be registered, such as, a notation of each word and a pronunciation of each word to be registered, are inputted word by word by the user; and (2) a method in which an application automatically performs all the necessary processings for word registration when the user merely designates a text that contains words to be registered.

In the latter method (2), for example, unknown words are extracted from a text, and pronunciations are appended to the extracted words, which are then added to a speech recognition dictionary. Words that are once registered may generally be retained until the user deletes them from the speech recognition dictionary.

However, electronic mails may generally contain substantially different written contents depending on topics to be discussed, such that words used in writing electronic mails frequently change from one mail to the other. As a result, when electronic mails are created by using speech recognition, words that are not included in a speech recognition dictionary would likely appear in high probability whenever topics changes, and it is assumed that the speech recognition dictionary would have to be updated in many occasions.

When a speech recognition dictionary is updated according to the method (1) described above, the user needs to input notations and pronunciations for words one by one, which is very onerous when there are many words to be registered as a result of changes of the topics. In contrast, the speech recognition dictionary can be more easily updated by the use of the method (2).

SUMMARY OF THE INVENTION

The present invention relates to a speech recognition dictionary creation method and a speech recognition dictionary creating device, which improve the users' convenience in using speech recognition dictionaries to be used in creating document data such as electronic mails through voice input.

In accordance with an embodiment of the present invention, a speech recognition dictionary creation method is provided for creating a speech recognition dictionary that is used for creating first document data through voice input in an application capable of communicating document data. The method includes the steps of: detecting that a document data creation processing is started; reading second document data obtained by the application when the document data creation processing is started; analyzing the second document data read and extracting unknown words that do not exist in an existing speech recognition dictionary; and creating a speech recognition dictionary containing the unknown words.

In accordance with another embodiment of the present invention, a speech recognition dictionary creation method is provided for creating a speech recognition dictionary that is used for creating mails through voice input in an application capable of communicating mails. The method includes the steps of: detecting that a mail creation processing is started; reading document data obtained in the application when the mail creation processing is started; analyzing the document data read and extracting unknown words that do not exist in an existing speech recognition dictionary; and creating a speech recognition dictionary containing the unknown words.

In accordance with another embodiment of the present invention, there is provided a speech recognition dictionary creating device for creating a speech recognition dictionary that is used for creating first document data through voice input in an application capable of communicating document data. The speech recognition dictionary creating device includes: a detection module that detects that a document data creation processing is started; a reading module that reads second document data obtained by the application when the document data creation processing is started; an extraction module that analyzes the second document data read and extracts unknown words that do not exist in an existing speech recognition dictionary; and a creation module that creates a speech recognition dictionary containing the unknown words.

In accordance with another embodiment of the present invention, there is provided a speech recognition dictionary creating device for creating a speech recognition dictionary that is used for creating mails through voice input in an application capable of communicating mails. The speech recognition dictionary creating device includes a detection module that detects that a mail creation processing is started; a reading module that reads document data obtained in the application when the mail creation processing is started; an extraction module that analyzes the document data read and extracts unknown words that do not exist in an existing speech recognition dictionary; and a creation module that creates a speech recognition dictionary containing the unknown words.

Other features and advantages of the invention will be apparent from the following detailed description, taken in conjunction with the accompanying drawings that illustrate, by way of example, various features of embodiments of the invention.

DETAILED DESCRIPTION OF THE PREFERRED EMBODIMENTS

First Embodiment

Figure 1:
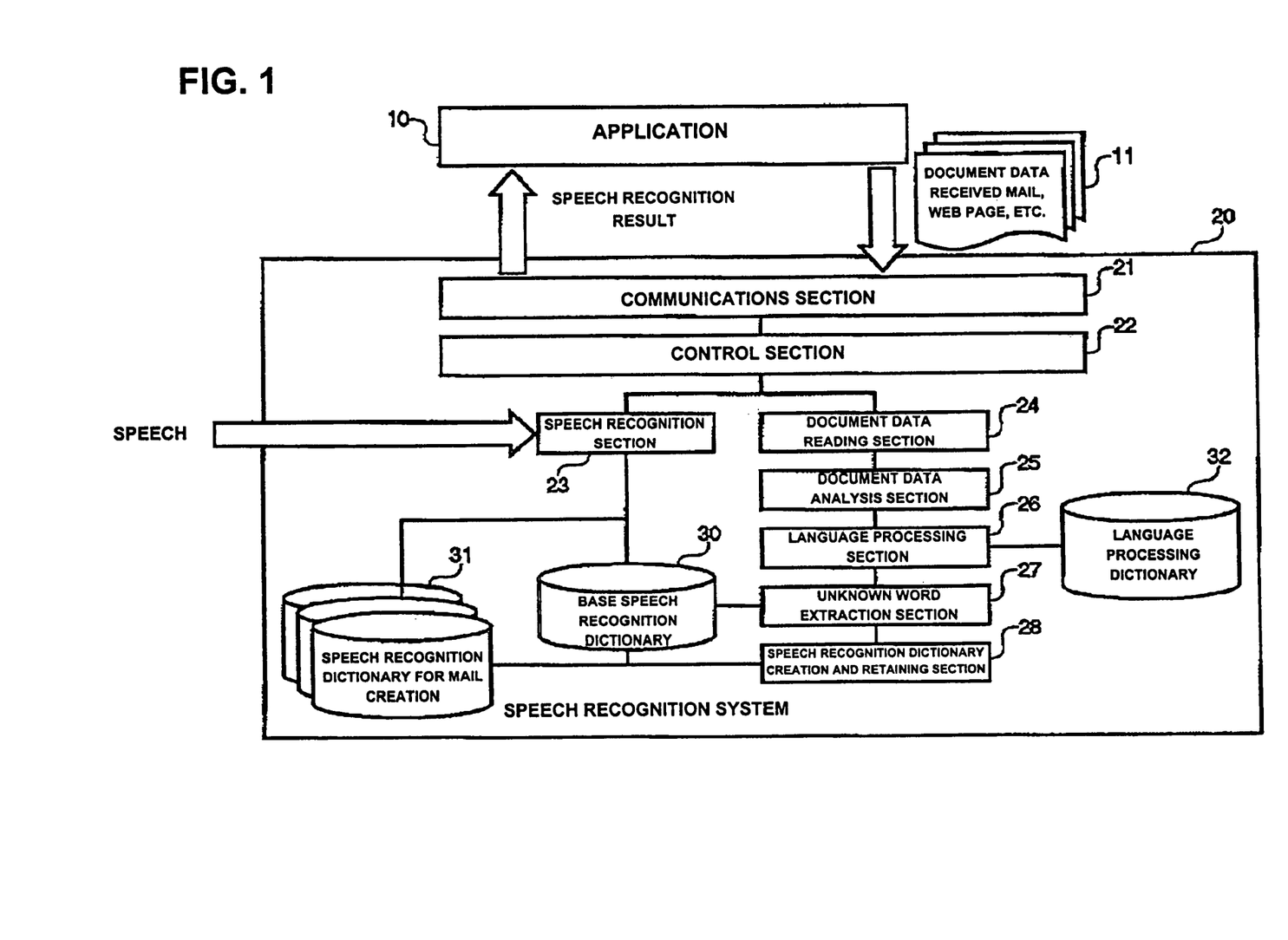
FIG. 1 is a diagram of one example of the structure of a speech recognition system that realizes a speech recognition dictionary creation method in accordance with a first embodiment of the present invention.

FIG. 1 is a block diagram illustrating a schematic structure of a speech recognition system 20 that realizes a speech recognition dictionary creation method in accordance with a preferred embodiment of the present invention.

The speech recognition system 20 includes a communications section 21, a control section 22, a speech recognition section 23, a document data reading section 24, a document data analysis section 25, a language processing section 26, an unknown word extraction section 27, a speech recognition dictionary creation and retaining section 28, a base speech recognition dictionary 30, a speech recognition dictionary for mail creation 31, and a language processing dictionary 32.

The communications section 21 detects events that are generated when documents in various types such as document data 11 are exchanged with an operating system (OS) and/or an external application 10, and when an input device such as a mouse and/or keyboard is operated by the user. The control section 22 controls various modules of the speech recognition system 20 that realizes a speech recognition dictionary creation method in accordance with an embodiment of the present invention, and governs the overall processings of the system.

The speech recognition section 23 performs a speech recognition processing on a speech that is inputted through an input device such as a microphone, by using the base speech recognition dictionary 30 and the speech recognition dictionary for mail creation 31, and outputs the recognition result to the application 10 through the communications section 21.

The document data reading section 24 reads document data 11 to be used when creating the speech recognition dictionary for mail creation 31 from the application through the communications section 21.

The document data analysis section 25 analyzes the structure of the document data 11 read in order to extract, from the document data 11, information necessary for creating the speech recognition dictionary for mail creation 31 and a text that is the content of the document data 11.

The language processing section 26 performs a morphemic analysis on the text extracted by the document data analysis section by using the language processing dictionary 32, divides the text into words, and adds information to each of the words, which is required for creating a speech recognition dictionary.

The unknown word extraction section 27 refers to the base speech recognition dictionary 30, and classifies the words divided by the language processing section 26 into words that exist and words that do not exist in the base speech recognition dictionary 30.

The speech recognition dictionary creation and retaining section 28 updates the speech recognition dictionary for mail creation 31 or creates a new speech recognition dictionary for mail creation 31 by adding thereto the words that do not exist in the base speech recognition dictionary 30, based on the word classification result provided by the unknown word extraction section 27. Also, the speech recognition dictionary creation and retaining section 28 deletes the speech recognition dictionary for mail creation 31 when the speech recognition dictionary for mail creation 31 becomes unnecessary. Also, when multiple mail creation recognition dictionaries 31 are used, the speech recognition dictionary creation and retaining section 28 updates and/or deletes each of the dictionaries and words in each of the dictionaries.

The base speech recognition dictionary 30 and the speech recognition dictionary for mail creation 31 are dictionaries that describe notations and pronunciations of words that are subject to speech recognition when the speech recognition section 23 performs the speech recognition. Words that have been prepared in advance by the speech recognition system 20 are registered in the base speech recognition dictionary 30. The speech recognition dictionary for mail creation 31 is a dictionary that contains words automatically registered by the speech recognition system 20, which becomes temporarily necessary depending on the content of each mail to be created. It is noted that the base speech recognition dictionary 30 may include words that may be personally selected and added (i.e., a personal dictionary).

The language processing dictionary 32 is a dictionary that describes information necessary for the language processing section 26 to perform the morphemic analysis on the words to find parts of speech and pronunciations to be added to the respective words.

Operations of the speech recognition system in FIG. 1 that is equipped with the structure described above will be described with reference to FIG. 2. It is noted that, in the following description, electronic mails are simply described as mails.

Figure 2:
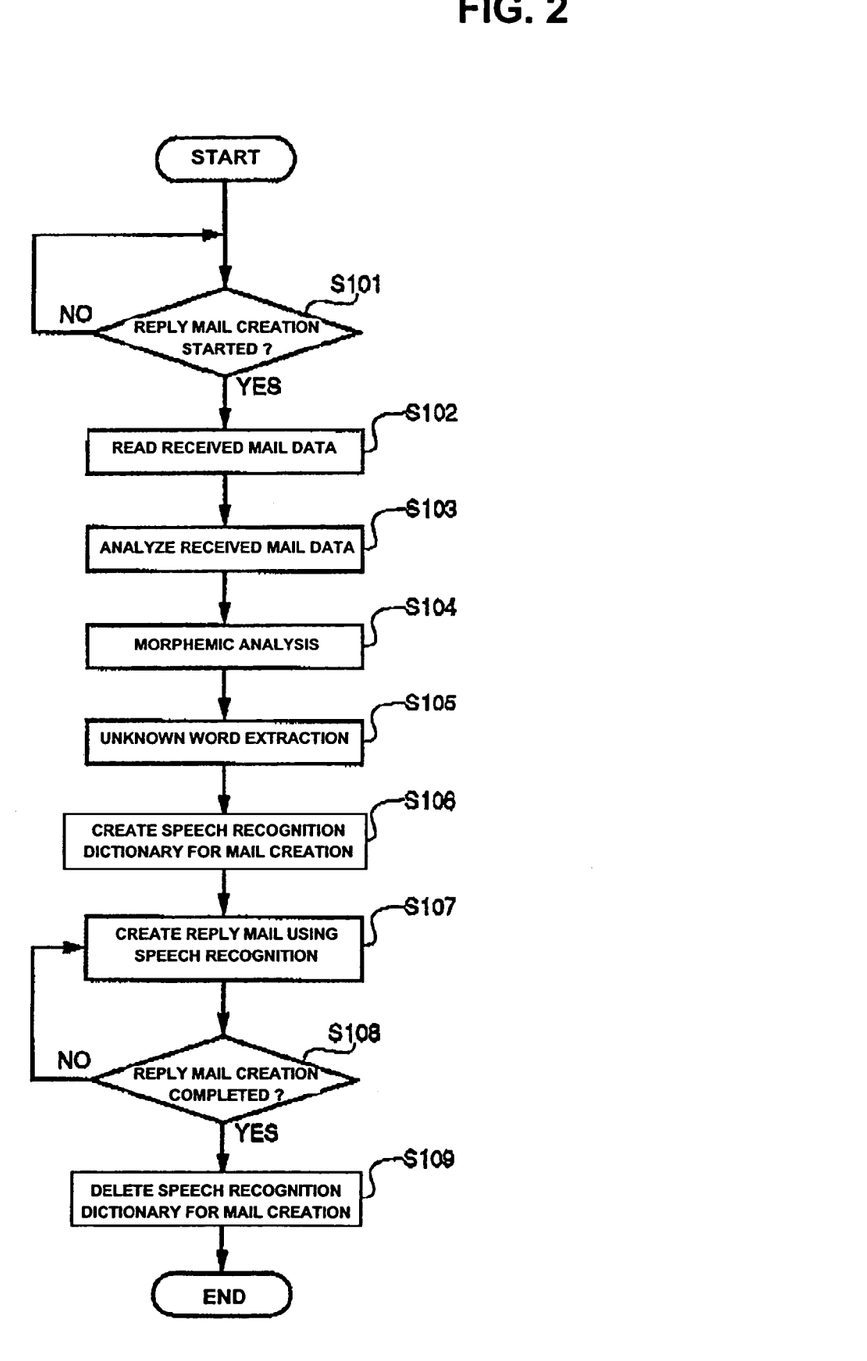
FIG. 2 is a flowchart of one example of operations of the speech recognition system that realizes the speech recognition dictionary creation method in accordance with the first embodiment of the present invention.

FIG. 2 is a flowchart of one example of operations of the speech recognition system that realizes the speech recognition dictionary creation method in accordance with the first embodiment of the present invention.

Referring to FIG. 2, a description will be made as to an overall process flow of processings performed by the embodiment system, which takes place when the user creates a reply mail by using speech recognition to a mail received in the mail application 10.

In the present embodiment, it is assumed that the user starts preparing a reply mail while viewing mails received by the user. In an ordinary mail application, when the user wants to start preparing a reply mail while viewing received mails, the user may use an input device such as a mouse to click on a "reply mail button" that may be displayed on a display device such as a display monitor, or selects a "reply mail item" from an application menu; and the application automatically displays a window for editing the reply mail.

The speech recognition system of the present embodiment starts a series of processings upon detection of such an operation by the user, i.e., an action which starts creation of a reply mail to a mail received. The user's operation can be detected through mutual communications made directly or via the operating system between the application 10 and the speech recognition system 20. For example, the application 10 may directly send to the speech recognition system 20 a message to start creating a reply mail, or the speech recognition system 20 may detect an event such as a mouse operation that is generated by the user's operation.

In the speech recognition system 20, when the communications section detects that the user starts a creation of a reply mail (step S101), the document data reading section 24 reads from the application 10 document data 11 of the received mail that is to be responded in a reply mail (step S102).

Figure 3:
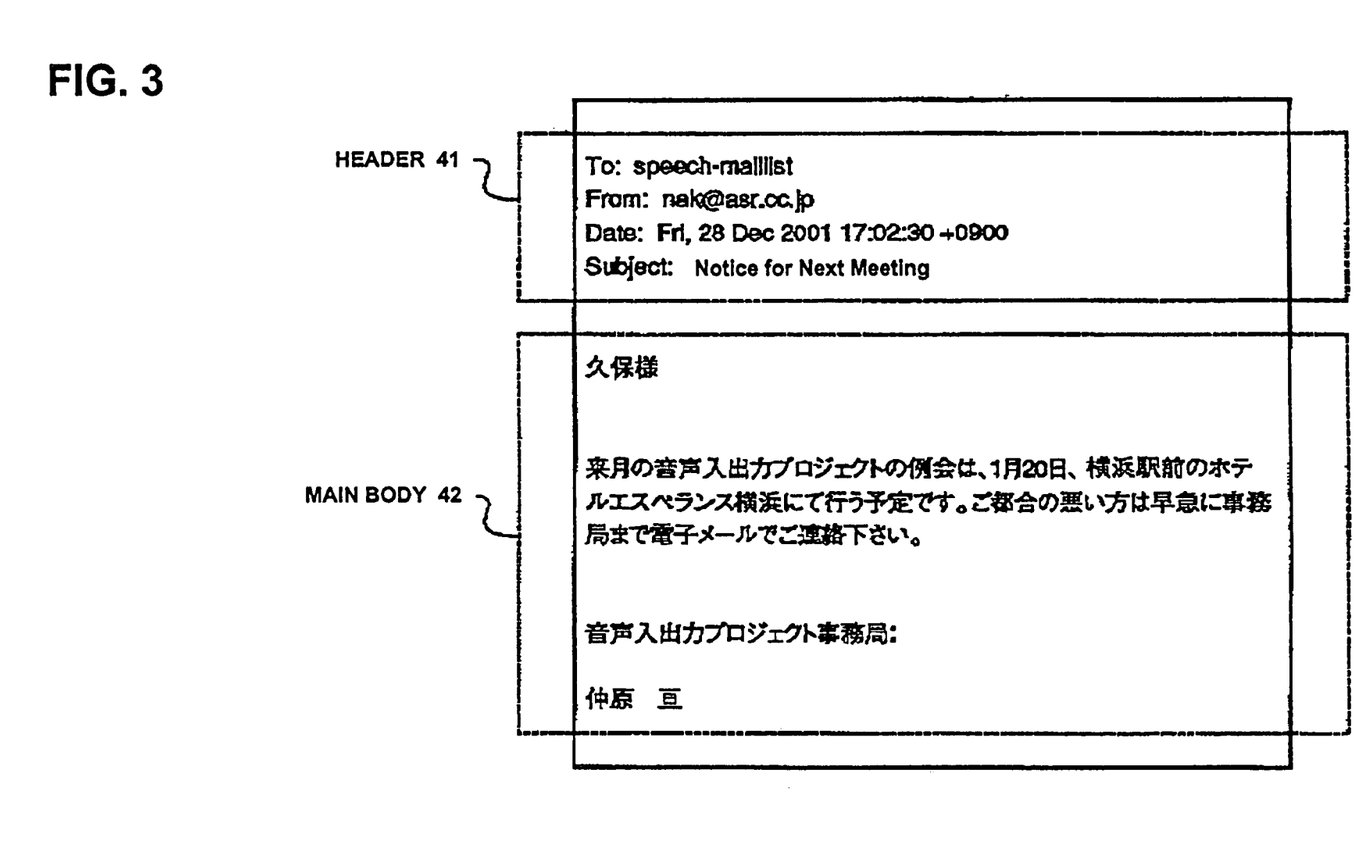
FIG. 3 is a diagram for describing one example of contents of an electronic mail received in the speech recognition system that realizes the speech recognition dictionary creation method in accordance with the first embodiment of the present invention.

Then, in step S103, the document data analysis section 25 analyzes the document data of the received mail, and transfers to the language processing section 26 a main body section of the mail in which a header of the mail that describes information about the destination, sender and the like is removed. FIG. 3 shows an example of the received mail that contains a header 41 and a main body section 42 (a Japanese text in this example). The document data analysis section 25 removes the header section 41 from the mail and transfers only the main body section 42 to the language processing section 26. When the read document data is a document described in HTML or XML, tags and other unnecessary sections are deleted by the document data analysis section 25.

Figure 4:
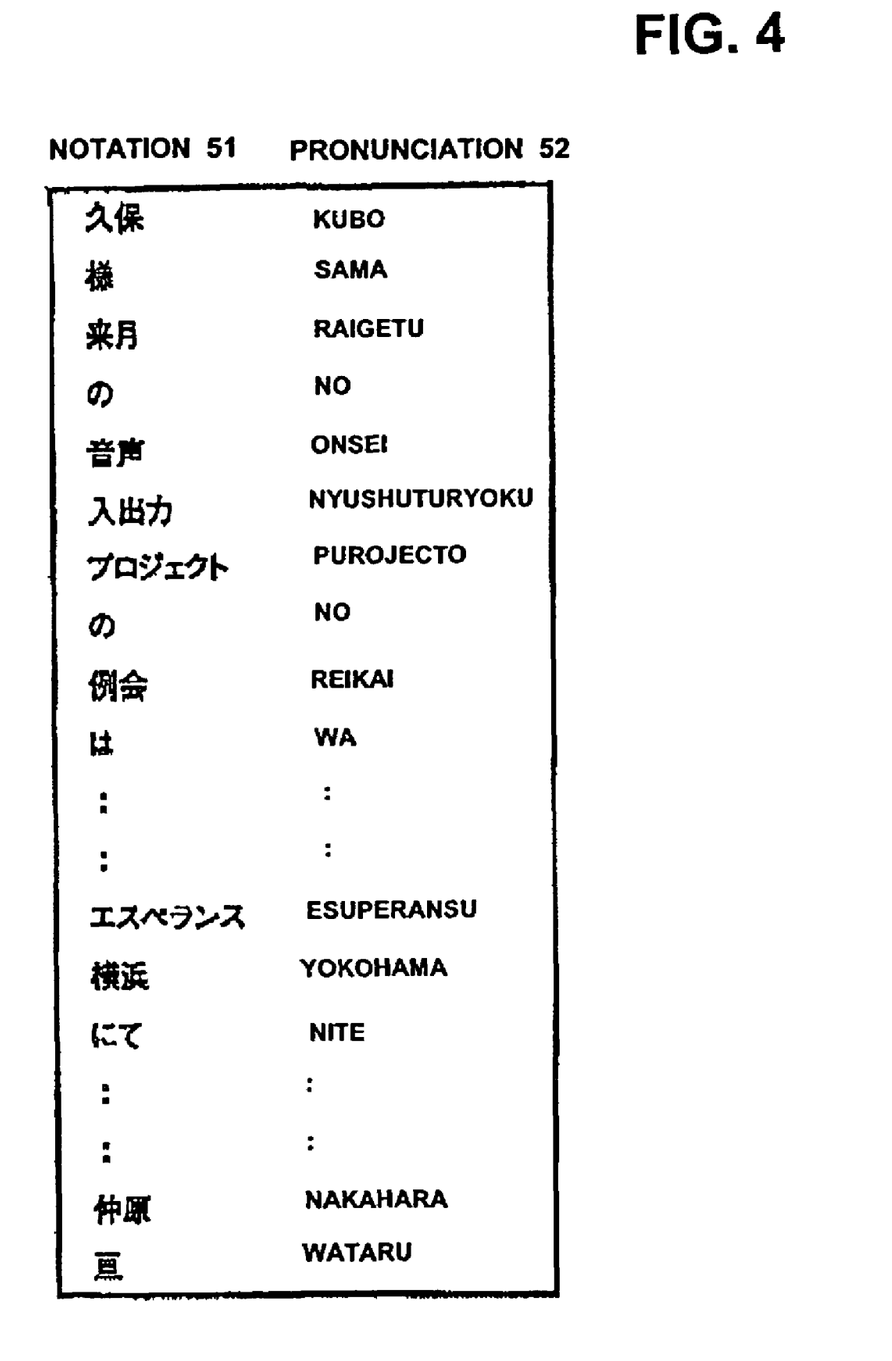
FIG. 4 is a diagram for describing one example of a result of morphemic analysis in the speech recognition system that realizes the speech recognition dictionary creation method in accordance with the first embodiment of the present invention.

The language processing section 26 performs a morphemic analysis on the delivered document data, and provides the analysis result to the unknown word extraction section 27 (step S105). In the morphemic analysis in accordance with the present embodiment, the document data that is solidly written is divided into morphemes (individual words), pronunciations are automatically appended to the respective morphemes, and the morphemic analysis result in a form indicated in FIG. 4, for example, is outputted. In this example, as indicated in FIG. 4, the morphemic analysis result includes notations 51 of the extracted individual words (Japanese words, in this example) listed on the left-hand side, and their pronunciations 52 listed on the right-hand side.

Next, in step S105, the unknown word extraction section 27 compares the base speech recognition dictionary 30 with the morphemic analysis result to classify the words into words that exist (known words) and at least one word (or words) that does (do) not exist (unknown word) in the base speech recognition dictionary 30.

Figure 5:
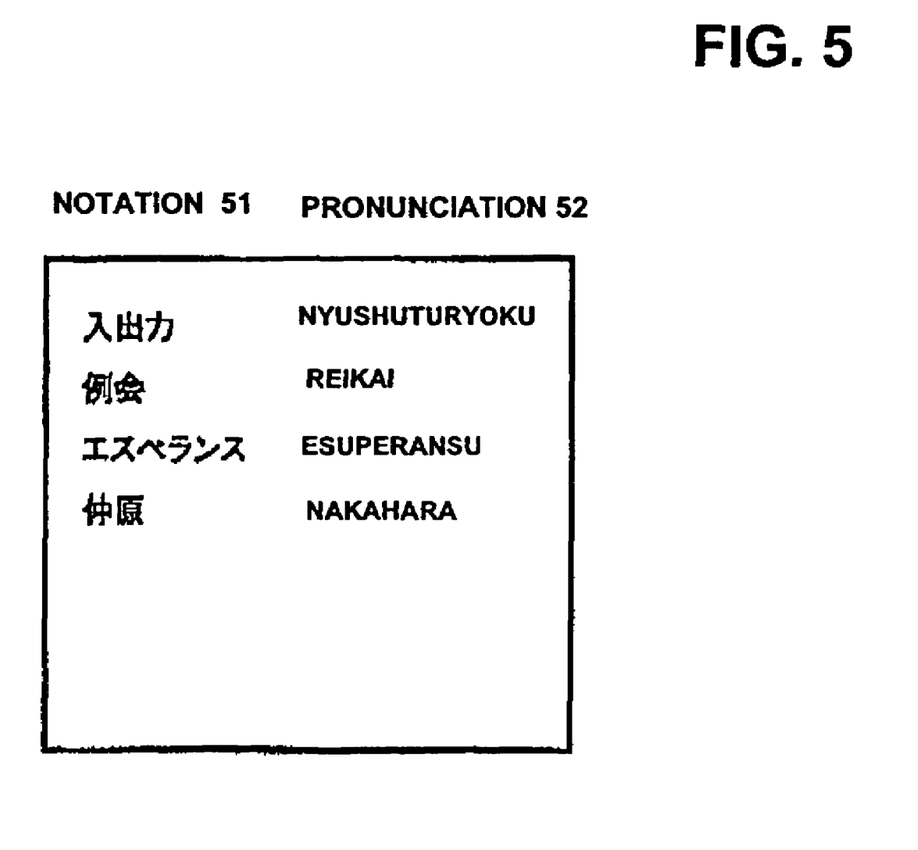
FIG. 5 is a diagram for describing one example of a speech recognition dictionary for mail creation of the speech recognition system that realizes the speech recognition dictionary creation method in accordance with the first embodiment of the present invention.

Based on the result of the unknown word extraction processing in step S105, the speech recognition dictionary creation and retaining section 28 creates in step S106 a new speech recognition dictionary that registers only the unknown words, and stores the same as a speech recognition dictionary for mail creation 31. FIG. 5 shows an example of the speech recognition dictionary for mail creation 31 that is created, wherein the words (at NOTATION 61 in FIG. 5) that are pronounced as "NYUSHUTURYOKU," "REIKAI," "ESUPERANSU" and "NAKAHARA" (at PRONUNCIATION 62 in FIG. 5) are classified as the unknown words in step S105.

In this example, items described in the speech recognition dictionary 31 are notations and pronunciations of the words. However, without being limited to these items in the example, the speech recognition dictionary 31 may include, for example, pronunciation information, information of parts of speech, frequency of occurrence (unigram) of words or the like, when such information are required for a speech recognition processing in a later processing stage.

By using the speech recognition dictionary for mail creation 31 that is created through the processings described above and the base speech recognition dictionary 30, the speech recognition section 23 performs speech recognition of user's voice that is inputted for creating a reply mail, and outputs the recognition result to the application through the communications section 21 (step S107). For speech recognition, both of the speech recognition dictionary for mail creation 31 and the base speech recognition dictionary 30 are used.

Next, upon detecting the completion of creation of the reply mail (step S108), the speech recognition dictionary for mail creation 31 that was created for the reply mail is deleted by the speech recognition dictionary creation and retaining section 28 (step S109). The completion of creation of the reply mail by the user can be detected by using a method, similar to the method used to detect the start of creating the reply mail, in which, when the user conducts a certain operation to send the reply mail, the application 10 may send to the speech recognition system 20 a massage indicating the completion of creation of the reply mail, or the communications section 21 may detect an event of the user's operation.

In accordance with the present embodiment, unknown words that do not exist in an existing speech recognition dictionary are extracted from document data obtained from a received mail, and the unknown words that may be necessary for creating a reply mail are registered in an independent speech recognition dictionary. It is therefore clear from the above that the speech recognition dictionary with an improved user's convenience can be created.

Second Embodiment

In step S109 in the first embodiment, the created speech recognition dictionary for mail creation 31 is deleted at the time when the completion of creation of the reply mail is detected. However, in accordance with another method that can be realized, the created speech recognition dictionary for mail creation 31 may be deleted after a predetermined period of time has passed. More specifically, the created speech recognition dictionary for mail creation 31 is not deleted at the same time when the creation of the reply mail is completed, but may be reused thereafter for a predetermined period of time. A process flow of processings that take place in this case will be described with reference to the drawings.

Since differences between the second embodiment and the first embodiment reside in the unknown word extraction processing in step S105, the processing to create a speech recognition dictionary for mail creation in step S106, and the processing to delete the speech recognition dictionary for mail creation in step S109, these processings are brought into focus and described.

Figure 6:
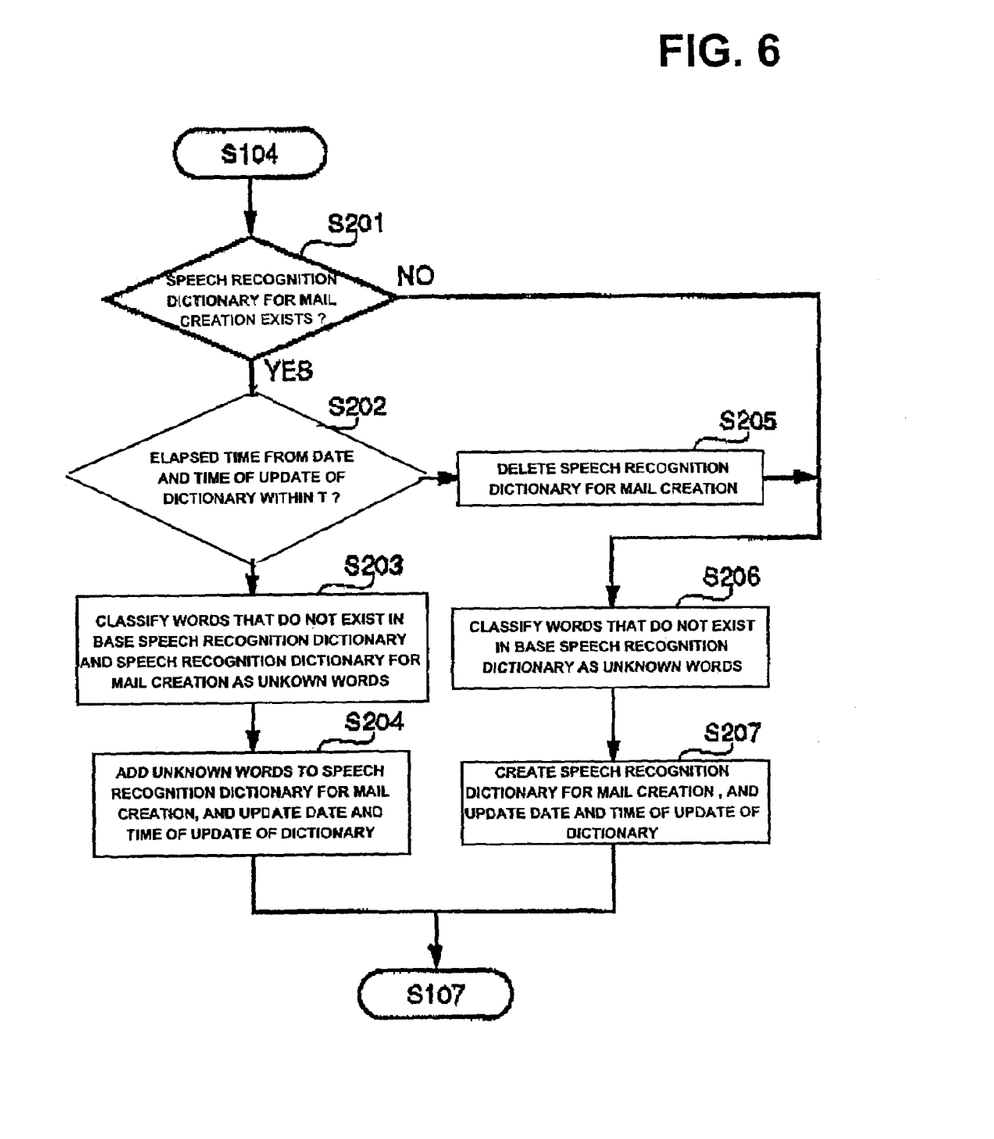
FIG. 6 is a flowchart of one example of operations of a speech recognition system that realizes a speech recognition dictionary creation method in accordance with a second embodiment of the present invention.

FIG. 6 is a diagram for describing a process flow of processings of the second embodiment, which correspond to step S105 and step S106 in FIG. 2

When extracting unknown words, a determination is made in step S201 as to whether or not a speech recognition dictionary for mail creation already exists; and the process proceeds to step S202 if it already exists, and to step S206 if it does not exist.

Figure 7:
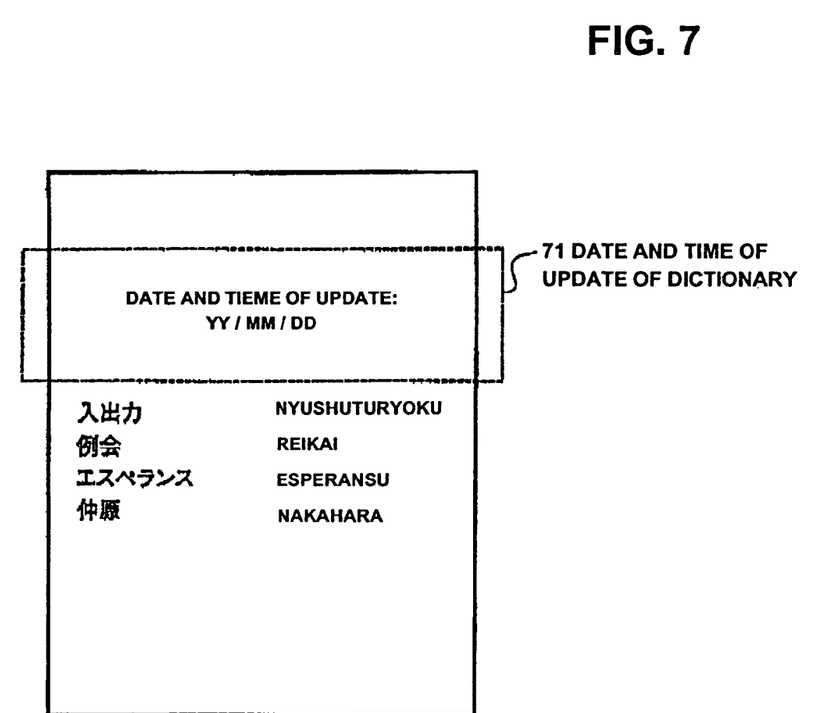
FIG. 7 is a diagram for describing one example of a speech recognition dictionary for mail creation of the speech recognition system that realizes the speech recognition dictionary creation method in accordance with the second embodiment of the present invention.

In step S202, whether or not the speech recognition dictionary for mail creation 31 is old is judged. For this judgment, date and time of update 71 are recorded for a speech recognition dictionary for mail creation that is created or updated in a processing in a later stage. An example in which date and time of update are recorded in a speech recognition dictionary for mail creation is shown in FIG. 7. The speech recognition dictionary for mail creation shown in FIG. 7 describes as "Date and Time of Update" time information such as the date and time when the dictionary was created or updated, besides notations and pronunciations of words just as the example of the speech recognition dictionary for mail creation shown in FIG. 5.

In the example shown in FIG. 7, time information is recorded within a speech recognition dictionary for mail creation. However, without being limited to this example, the date and time of update may be recorded independently of a speech recognition dictionary for mail creation.

Also, a predetermined passage of time T may be set in any units, such as, for example, units of days, units of months, units of hours, etc.

Returning to the description of FIG. 6, in step S202, if the elapsed time from the date and time of update of the speech recognition dictionary for mail creation 31 up to the current time exceeds the value T, the speech recognition dictionary for mail creation 31 is deleted (step S205). On the other hand, when the passage of time elapsed from the date and time of update of the speech recognition dictionary for mail creation 31 does not exceed the value T, unknown words are added to the speech recognition dictionary for mail creation 31 to update the dictionary 31 through the following processings.

In step S203, among the words that are obtained in the morphemic analysis in step S104, those of the words that do not exist either in the base speech recognition dictionary or in the speech recognition dictionary for mail creation are classified as unknown words.

In step S204, the words that have been classified as the unknown words are added to the speech recognition dictionary for mail creation to update the speech recognition dictionary for mail creation. In this instance, the date and time of update of the speech recognition dictionary for mail creation is updated.

Next, processings starting with step S206, which take place when a speech recognition dictionary for mail creation does not exist or has been deleted, will be described.

In step S206, for extracting unknown words, the morphemic analysis result is compared with the base speech recognition dictionary 30, and those of the words that do not exist in the base speech recognition dictionary 30 are classified as unknown words. Then, in step S207, a speech recognition dictionary for mail creation containing the unknown words is created anew. At this moment, the creation time, in other words, the date and time of update of the speech recognition dictionary for mail creation is updated.

Then, processings similar to the processings starting with step S107 in the first embodiment are conducted in creating a reply mail, using the speech recognition dictionary for mail creation 31 that has been created or updated through the processings described above. However, in this embodiment example, the reply mail creation processing ends without executing the processing in step S109 in which the speech recognition dictionary for mail creation is deleted upon completion of creation of the reply mail.

In accordance with the present embodiment, a speech recognition dictionary that has become unnecessary is automatically deleted after a predetermined period of time has elapsed, and a speech recognition dictionary is renewed. It is therefore clear from the above that the enlargement of the dictionary size can be prevented, and the users' convenience in using speech recognition dictionaries is improved.

Third Embodiment

Figure 8:
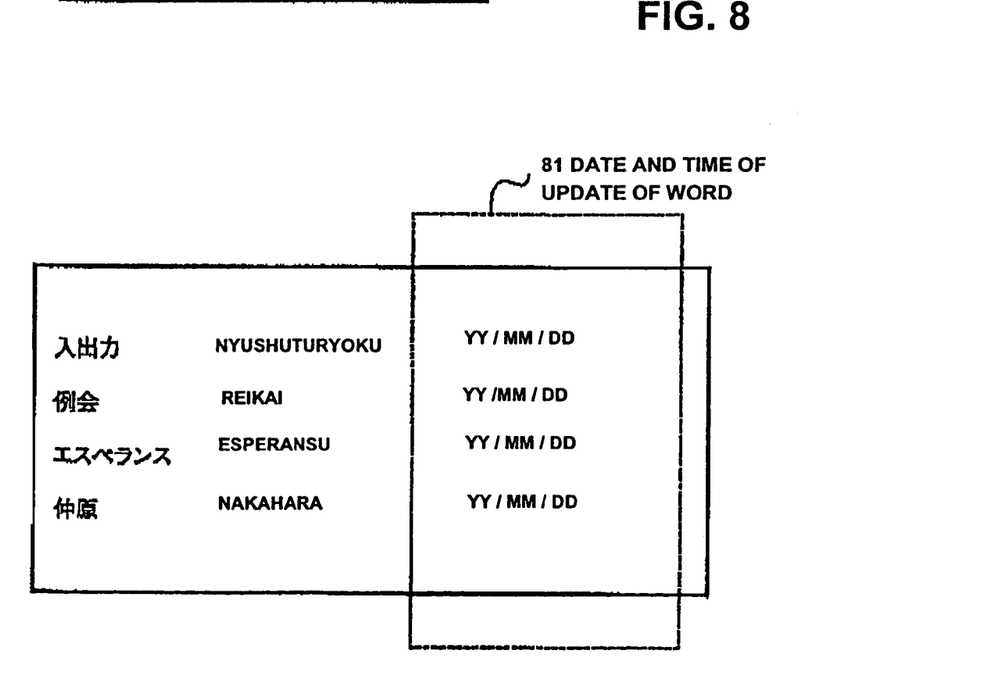
FIG. 8 is a diagram for describing one example of a speech recognition dictionary for mail creation of a speech recognition system that realizes a speech recognition dictionary creation method in accordance with a third embodiment of the present invention.

In the second embodiment described above, the deletion of the speech recognition dictionary for mail creation 31 is performed for each speech recognition dictionary for mail creation. In other words, the speech recognition dictionary for mail creation 31 is entirely deleted. However, such deletion can be managed in units of words. In this case, the date and time of update is managed in units of words contained in a speech recognition dictionary for mail creation 31. An example in which date and time of update for each of the words is described in the speech recognition dictionary for mail creation 31 is shown in FIG. 8. As shown in FIG. 8, time information 81 indicating the time and date when each of the words is registered or updated is appended to the corresponding word, besides a notation and a pronunciation of the word.

A process flow of processings that take place when such a speech recognition dictionary for mail creation 31 is used will be described with reference to FIG. 9.

Since differences between the third embodiment and the first embodiment reside in the unknown word extraction processing in step S105, the processing to create a speech recognition dictionary for mail creation in step S106, and the processing to delete the speech recognition dictionary for mail creation in step S109, these processings are brought into focus and described.

Figure 9:
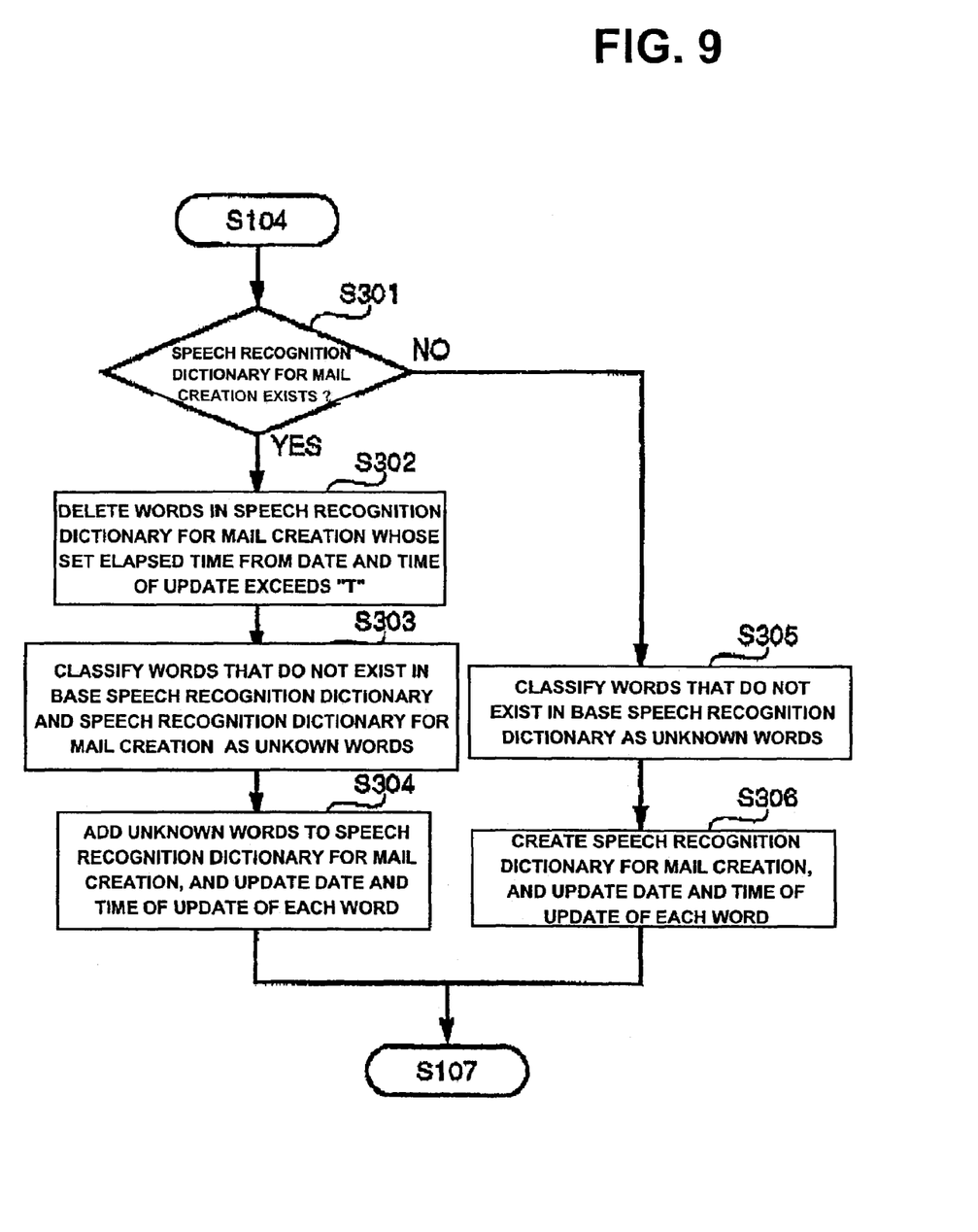
FIG. 9 is a flowchart of one example of operations of the speech recognition system that realizes the speech recognition dictionary creation method in accordance with the third embodiment of the present invention.

FIG. 9 is a diagram for describing a process flow of processings of the third embodiment, which correspond to step S105 and step S106 in FIG. 2

After the morphemic analysis in step S104 is completed, a determination is made in step S301 as to whether or not a speech recognition dictionary for mail creation exists; and the process proceeds to step S302 if it exists, and to step S305 if it does not exist.

In step S302, among the words registered in the speech recognition dictionary for mail creation 31, those of the words whose passage of time has exceeded the predetermined value T from the date and time of update 81 are deleted. Next, among the words obtained by the morphemic analysis in step S104, those of the words that do not exist in the base speech recognition dictionary 30 or the speech recognition dictionary for mail creation 31 are classified as unknown words.

Then, in step S304, the words classified as the unknown words are additionally registered in the speech recognition dictionary for mail creation 31, and the date and time of update 81 for each of the added words is set to the current time.

Furthermore, when there are words, which are not unknown words, among the words obtained as a result of the morphemic analysis, and which are the same words registered in the speech recognition dictionary for mail creation 31, the date and time of update 81 of each of the registered words is updated to the current time.

In other words, the date and time of update of each of the words that have already been registered in the speech recognition dictionary for mail creation 31 is updated if document data 11 newly read contains the corresponding words.

Next, processing starting with step S305 to be executed when a speech recognition dictionary for mail creation does not exist will be described.

In step S305, for extracting unknown words, the morphemic analysis result and the base speech recognition dictionary 30 are compared, and words that do not exist in the base speech recognition dictionary are classified as unknown words.

Then, in step S306, a speech recognition dictionary for mail creation 31 that contains the unknown words is created anew. At this time, the date and time of update of each of the words registered in the speech recognition dictionary for mail creation 31 is updated to the current time.

In accordance with the present embodiment, any word contained in a speech recognition dictionary that has become unnecessary can be automatically deleted after a predetermined period of time has elapsed. It is therefore clear from the above that the users' convenience in the use of speech recognition dictionaries is further improved.

Fourth Embodiment

In each of the embodiments described above, each of the speech recognition systems uses a single speech recognition dictionary for mail creation. However, when a speech recognition dictionary for mail creation is retained for a predetermined period of time as in the second or third embodiment, there may be occasions where the user finds it convenient if a plurality of mail creation recognition dictionaries are to be used individually depending on the purposes of mails to be created. For example, when reply mails are written, as in the case of the embodiments described herein, to different mail recipients, topics and words to be used in the mails may vary depending on the mail recipients. Accordingly, a higher speech recognition performance can be expected if a plurality of mail creation recognition dictionaries are used individually depending on different mail transmission destinations or mail recipients.

Each mail transmission destination may be obtained from the application through the communications section 22. Alternatively, when document data of a received mail is analyzed in step S103, information for the transmission source of the mail received can be extracted from its header information 41, and the transmission source can be determined as a mail transmission destination.

Similarly, each topic may be obtained from the application, or the subject of each received mail can be extracted as a topic.

By creating a speech recognition dictionary for mail creation for each of the main transmission destinations or topics thus extracted or obtained, the mail creation recognition dictionaries with a greater convenience can be provided.

Fifth Embodiment

In each of the embodiment examples described above, the description is made as to the processings that are performed when a reply mail is created. However, without being limited to these examples, the present invention is also applicable to other situations, for example, when the user creates a mail through clicking a portion described with a "mailto" tag on a web browser.

In this case, a structured document, which is written in a page description language such as HTML that is used for displaying a page in which the "mailto" is described, corresponds to document data 11. The document described in a page description language includes many tags for formatting the document. However, only characters displayed on the web browser can be extracted by having the document data analysis section 25 perform a processing similar to the analysis (parsing) performed by the web browser. Accordingly, the first through fourth embodiments, which are described above using an example of creating a reply mail, are also applicable to situations, systems, devices, etc., where a mail is sent from a web browser, which result in generally the same effects obtained by the first through fourth embodiments described above.

Furthermore, in this case, in addition to the method for managing a plurality of mail creation recognition dictionaries for each transmission destination and/or topic (subject), which is described in the fourth embodiment, the plurality of mail creation recognition dictionaries can also be managed for each individual URL.

Sixth Embodiment

The passage of time T, which is the basis for deleting each registered word or each speech recognition dictionary for mail creation, may be set by the user.

Seventh Embodiment

In the embodiment examples described above, the description is made as to the processings which are performed when a reply mail or reply mails are created. However, without being limited to these examples, the present invention is also applicable to situations, systems, devices, etc., in which other types of document data are created.

OTHER EMBODIMENTS

The present invention is also applicable to a system that is composed of a plurality of devices (such as, for example, a host computer, interface device, reader, printer, etc.), or to an apparatus composed of a single device (such as, for example, a copy machine, facsimile machine, etc.).

The objective of the present invention can be achieved by supplying to a system or a device a storage medium that stores program codes of software that realizes the functions of the embodiments described above, and by having a computer (or a CPU or an MPU) of the system or the device read and execute the program codes stored in the storage medium. In this case, the program codes themselves that are read from the storage medium realize the functions of the embodiment described above, and the storage medium that stores the program codes constitutes the present invention.

As the storage medium for supplying the program codes, for example, a floppy® disk, hard disk, optical disk, optical magnetic disk, CD-ROM, CD-R, magnetic tape, nonvolatile memory card, ROM, etc. can be used.

Furthermore, the present invention is applicable not only when the program codes read by a computer are executed to realize the functions of each of the embodiments described above, but also when an operating system (OS) that operates on the computer performs a part or all of the actual processing based on instructions contained in the program codes, and realizes the functions of each of the embodiments described above through the processing being performed.

Moreover, the present invention is also applicable when the program codes that are read from the storage medium are written in a memory provided on an expansion card inserted into a computer or on a function expansion unit connected to a computer, and a CPU provided on the expansion card or the function expansion unit performs a part or all of the actual processing based on instructions contained in the program codes and realizes the functions of each of the embodiments through the processing being performed.

As described above, in accordance with the present invention, when a speech recognition dictionary that is used for creating document data by voice input is created, the user's convenience in using the speech recognition dictionary (for example, the manageability, the usability and/or the efficiency of the speech recognition dictionary) can be improved.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A method for creating a speech recognition dictionary to be used for creating a mail through voice input in an application, the method comprising the steps of:

receiving a transmitted mail from a transmission source;

obtaining a speech recognition dictionary corresponding to the transmission source, wherein the speech recognition dictionary is obtained from a memory which retains a plurality of speech recognition dictionaries;

detecting if a mail creation processing involving the transmitted mail is started;

reading the transmitted mail when the mail creation processing is detected;

analyzing the transmitted mail and extracting a plurality of unknown words;

updating the speech recognition dictionary by adding thereto the plurality of unknown words;

storing registration time information for each of the plurality of unknown words, which indicates a time when the unknown word is added to the speech recognition dictionary; and deleting each one of the plurality of unknown words when a specified period of time set for the each one of the plurality of unknown words has elapsed from the time indicated by the registration time information.

2. A method according to claim 1, wherein the registration time information further indicates a date when each of the plurality of unknown words is added.

3. A storage medium storing a control program for realizing a method for creating a speech recognition dictionary that is used for creating a mail through voice input in an application, the method comprising the steps of:

receiving a transmitted mail from a transmission source;

obtaining a speech recognition dictionary corresponding to the transmission source, wherein the speech recognition dictionary is obtained from a memory which retains a plurality of speech recognition dictionaries;

detecting if a mail creation processing involving the transmitted mail is started;

reading the transmitted mail when the mail creation processing is detected;

analyzing the transmitted mail and extracting a plurality of unknown words;

updating the speech recognition dictionary by adding thereto the plurality of unknown words;

storing registration time information for each of the plurality of unknown words, which indicates a time the unknown word is added to the speech recognition dictionary; and deleting each one of the plurality of unknown words when a specified period of time set for the each one of the plurality of unknown words has elapsed from the time indicated by the registration time information.

4. A method according to claim 1, wherein said analyzing step performs the extracting by extracting words in the transmitted mail that do not exist in a base speech recognition dictionary.

5. A method according to claim 1, wherein said analyzing step performs the extracting by extracting words in the transmitted mail that do not exist in either the speech recognition dictionary or a base speech recognition dictionary.

6. A method according to claim 1, wherein said analyzing step performs the extracting by extracting words in the transmitted mail that do not exist in at least one of the plurality of speech recognition dictionaries retained in the memory.

7. A storage medium according to claim 3, wherein said analyzing step performs the extracting by extracting words in the transmitted mail that do not exist in a base speech recognition dictionary.

8. A storage medium according to claim 3, wherein said analyzing step performs the extracting by extracting words in the transmitted mail that do not exist in either the speech recognition dictionary or a base speech recognition dictionary.

9. A storage medium according to claim 3, wherein said analyzing step performs the extracting by extracting words in the transmitted mail that do not exist in at least one of the plurality of speech recognition dictionaries retained in the memory.

* * * * *